United States Patent
Bryant et al.

(10) Patent No.: US 6,232,722 B1
(45) Date of Patent: May 15, 2001

(54) TAIL LIGHT ADAPTER BETWEEN A TOWING VEHICLE AND TRAILER

(75) Inventors: Richard C. Bryant, Rialto, CA (US); Richard Johnson, Tecumseh, MI (US)

(73) Assignee: Draw-Tite, Inc. (by Richard Johnson), Canton, MI (US)

(*) Notice: Subject to any disclaimer, the term of this patent is extended or adjusted under 35 U.S.C. 154(b) by 0 days.

(21) Appl. No.: 09/306,975

(22) Filed: May 7, 1999

Related U.S. Application Data

(60) Provisional application No. 60/084,593, filed on May 7, 1998.

(51) Int. Cl.⁷ ................................................ B60Q 1/26
(52) U.S. Cl. ........................ 315/80; 315/77; 340/468; 307/10.1
(58) Field of Search ........................... 315/77, 82, 80, 315/83, 93, 129, 130, 132, 133, 136, 312; 340/431, 458, 468, 483; 307/9.1, 10.1, 10.8; 362/485, 498, 499

(56) References Cited

U.S. PATENT DOCUMENTS

| | | |
|---|---|---|
| 3,970,860 | 7/1976 | Purdy . |
| 4,005,313 | 1/1977 | Tibbits . |
| 4,006,453 | 2/1977 | Bryant . |
| 4,017,827 | 4/1977 | Brodesser . |
| 4,064,413 | 12/1977 | Andersen . |
| 4,751,431 | 6/1988 | Ducote . |
| 4,857,807 | 8/1989 | Hargis . |
| 5,369,823 | 12/1994 | Hochschild, III . |
| 5,389,823 * | 2/1995 | Hopkins et al. ............... 307/10.1 |
| 5,498,910 * | 3/1996 | Hopkins et al. ............... 307/10.1 |
| 5,521,466 | 5/1996 | Vincent . |
| 5,701,116 | 12/1997 | Hoekstra . |
| 5,760,545 | 6/1998 | Mikel . |
| 5,767,589 | 6/1998 | Lake et al. . |

\* cited by examiner

Primary Examiner—David Vu
Assistant Examiner—Ephrem Alemu
(74) Attorney, Agent, or Firm—Reising, Ethington, Barnes, Kisselle, Learman & McCulloch, P.C

(57) ABSTRACT

An electrical taillight adapter circuit (6) interfaces a three-lamp vehicle lighting circuitry (2) with a two-lamp trailer lighting circuitry (6). The vehicle lighting circuitry primarily includes a group (10) of three right hand lamps (20, 22, 24) and a group (12) three of left-hand lamps (12). These lamps operate in response to signals generated by the vehicle operator, and are electrically connected to the adapter circuit. The trailer circuit generally includes a group (14) of two right hand lamps (34, 36) and a group (16) of two left-hand lamps (35, 37). The adapter circuitry receives electrical signals from the vehicle circuit (2), processes them, and outputs power to the appropriate trailer lamp. This electrical taillight adapter circuit (4) interfaces the nonconforming taillight circuit of a vehicle with that of a trailer, while providing the trailer lamps with improved output current and protecting the system from short circuit conditions.

7 Claims, 1 Drawing Sheet

TAIL LIGHT ADAPTER BETWEEN A TOWING VEHICLE AND TRAILER

This application claims the benefit of Provisional No. 60/084,593 filed May. 7, 1998.

TECHNICAL FIELD

This invention relates to an adapter to be installed between a towing vehicle tail light system and a trailer tail light system.

BACKGROUND OF THE INVENTION

It is necessary to control the lighting system of a trailer in response to the lighting system of a towing vehicle. Devices for interfacing the lighting systems of towing vehicles and their respective trailers are well known. Most trailer lighting systems have combined the turn and brake signals in a single lamp with a single filament. Most modern day towing vehicles have separate turn signal and brake lamps. Thus, some kind of adapter circuitry is needed in order to interface the two systems, which would otherwise be incompatible.

Many devices known in the art accomplish this interface by using some kind of logic and switching circuitry. In essence the trailer lighting system is wired in parallel to the vehicle lighting system. Such a system uses the same power signal to illuminate both the trailer lamps and the towing vehicle lamps. To ensure that the signal, which reaches the trailer lamps, will be sufficient to adequately illuminate them, the original power signal through the vehicle lamps must have an increased amount of current. There are many disadvantages to such a system. For example, the flashers on the towing vehicle must be replaced with heavy-duty flashers to endure the increased current through them.

Devices have been developed that illuminate the vehicle and trailer lamps with separate power signals. This can be accomplished through the use of solid state switching devices, such as transistors, relay coils, or other types of signal detection devices. However, the known devices have many disadvantages. For example, they are susceptible to short circuit conditions, or are unable to disable a trailer lamp when both the brakes and a turn signal are engaged.

SUMMARY OF THE INVENTION

In accordance with one aspect of the invention, an electrical adapter apparatus interfaces the electrical circuitry of a towing vehicle lighting system with the electrical circuitry of a trailer lighting system. The electrical adapter apparatus includes a plurality of vehicle signal inputs. The vehicle signal inputs are capable of receiving electrical signals from the towing vehicle lighting system, such as taillights, stop lights and turn signal lights. A power supply input is connectable to a power supply. The adapter has a circuit with a plurality of three terminal transistors. Each of the three terminal transistors has a first transistor terminal being coupled to one of said vehicle signal inputs, a second transistor terminal being electrically grounded and a third transistor terminal being connected to the power supply input. Preferably the plurality of three terminal transistors includes a first transistor having its first terminal connection to a brake signal input. A second transistor has its first terminal connected to a right turn signal input. A third transistor has its first terminal connected to the brake input. A fourth transistor has its first terminal connected to a left turn signal input.

The adapter circuit also has a plurality of two-direction relays. Each of the two direction relays has two terminals. Each of said two direction relay terminals is connected to a respective third transistor terminal and the power input through separate resistive paths.

Preferably the plurality of two direction relays includes a first and second direction relay. The first relay has a first terminal connected to the third terminal of the first transistor and its second terminal connected to the third terminal of the second transistor. The second relay has its first terminal connected to the third terminal of the third transistor and its second terminal connected to the third terminal of the fourth transistor.

Each tvo-direction relay is associated with a relay contact. Each relay contact is openable and closeable to be selectively connected to said power supply input to a plurality of trailer signal outputs. The plurality of relay contacts preferably includes a first and second contact with respective first terminals operably connectable to the power supply input and respective second terminals connected to respective right and left stop turn lamp outputs to the trailer.

In one embodiment the electrical adapter apparatus includes a third vehicle signal input with an additional transistor having its first terminal connected to said third vehicle signal input its second terminal connected to ground and its third terminal connected to a first terminal end of an additional relay. The additional relay has its second terminal connected to the power supply input.

An additional relay contact is operably connected to the relay with its first terminal connected to the power supply input and said second tenninal to an additional trailer signal output such as the trailer tail light.

The present invention is an improved adapter circuitry for interfacing a towing vehicle and a trailer lighting system, which have a different number of lamps. This adapter circuitry illuminates the vehicle and trailer lamps with separate power sources. This provides sufficient current to the trailer lamps without requiring an increased current through the vehicle lamps. In addition, driving the two lighting systems with a separate power source keeps the lighting systems isolated from each other, thereby reducing the possibilities of a short circuit. Also, the present invention utilizes solid state switching devices and relay circuits to account for trailer lamps, which share brake and turn signals. When both the vehicle brake and turn signals are engaged, the trailer lamp flashes 180° out of phase with the respective vehicle lamp, instead of being overridden by just the brake signal. The current invention solves the problem of interfacing non-compatible lighting systems, while improving the trailer lamp output current, reducing the system's vulnerability to short circuit conditions, and accounting for the trailer's shared brake and turn lamps.

DETAILED DESCRIPTION OF THE PREFERRED EMBODIMENT

Figure 1:
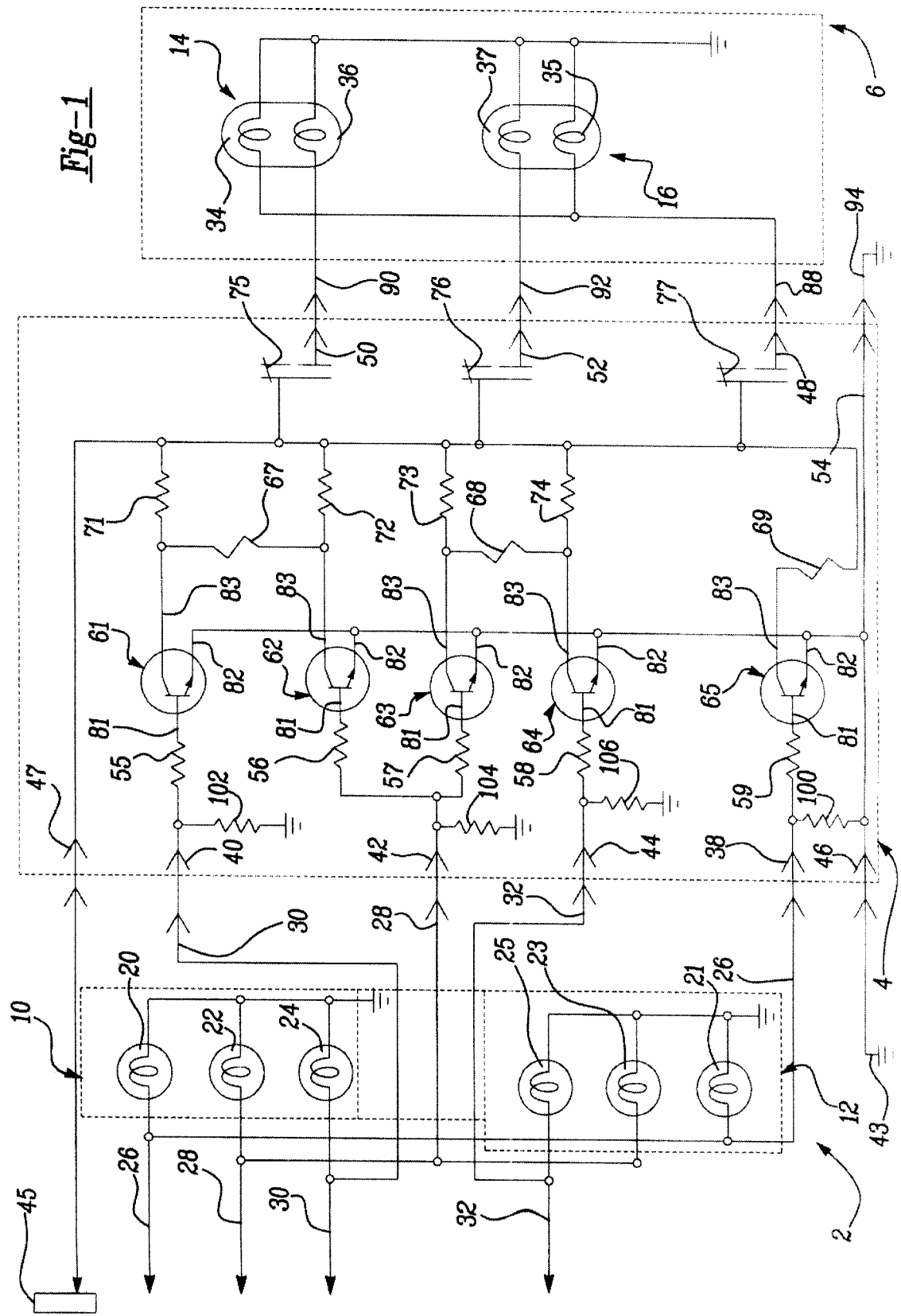
FIG. 1 is an electrical schematic diagram of the preferred embodiment of the present invention.

With reference to FIG. 1, there is an electrical taillight adapter circuitry 4, which interfaces a three-lamp vehicle lighting circuitry 2 with a two-lamp trailer lighting circuitry 6. The towing vehicle lighting circuitry 2 primarily includes a group of three right hand lamps 10 and three left-hand lamps 12. These lamps operate in response to signals generated by the vehicle operator, and are electrically connected to the adapter circuitry 4. The trailer circuitry 6 generally includes a group of two right hand lamps 14 and a group of two left-hand lamps 16. The different number of lamps between the vehicle and trailer requires an electrical adapter, hence the purpose of this invention. The adapter circuitry 4 receives electrical signals from the vehicle circuitry, processes them, and outputs power to the appropriate trailer lamp. This electrical taillight adapter interfaces the nonconforming taillight circuitry of a vehicle with that of a trailer, while providing the trailer lamps with improved output current and protecting the system from short circuit conditions.

The right and left-hand groups of lamps 10, 12 are arranged at opposite sides of the towing vehicle's rear. The right hand lamps 10 include a right tail lamp 20 (or clearance lamp), a right brake lamp 22, and a right turn lamp 24. The left hand lamps 12 includes a left tail lamp 21 (or clearance lamp), a left brake lamp 23, and a left turn lamp 25. The clearance lamps of both sides 20, 21 are commonly connected to vehicle clearance input 26, and therefore, operate simultaneously when the vehicle headlights are actuated for nighttime mode. The brake lamps of both sides 22, 23 are commonly connected to vehicle brake input 28, and therefore operate simultaneously when the brakes are engaged. The right and left turn lamps 24, 25 are independent of each other and are connected to vehicle right and left turn inputs 30 and 32, respectively. These lamps respond to actuation of their associated vehicle turn signals. Each vehicle lamp is connected to an input signal at one terminal and grounded at the other. An input signal from the vehicle will create a potential drop across the lamp, and therefore, cause current to flow through the respective lamp and illuminate it. The vehicle signal inputs 26, 28, 30, 32 are connected to adapter connections 38, 40, 42, 44 which pass the vehicle signals onto adapter circuitry 4. The right and left vehicle turn inputs, 30 and 32, are connected to adapter connections 40 and 44, respectively. The common vehicle clearance input 26 is connected to adapter connection 38, and vehicle brake input 28 is connected to adapter connection 42. Adapter connection 46 provides adapter circuitry 4 with ground 43, while adapter input connection 47 connects adapter circuitry 4 with a DC power supply 45. Therefore, the vehicle circuitry has six lamps and six connections to the adapter, including connections 46 and 47. The circuitry 4 has only four output connections 48, 50, 52, and 54.

The trailer lighting circuitry 6 includes four input connections 88, 90, 92, 94 with adapter circuitry 4. The right-hand group 14 of lamps includes trailer lamps 34 and 36. The left-hand group 16 includes lamps 35 and 37. Both of the trailer taillights 34 and 35, are commonly connected to power input connection 48 and are grounded. Therefore, if input connection 48 is energized, lamps on both sides of the trailer 34, 35 will be illuminated. Input connection 50 is connected to trailer right hand turn lamp 36. Therefore, trailer right hand turn lamp 36 will illuminate according to the signal at input connection 50. Input connection 52 is connected to trailer left-hand turn lamp 37. Input connection 54 provides the trailer lighting circuitry 6 with ground. The four output connections 26, 28, 30, 32, ground supply 43, and DC power supply 45 of the towing vehicle lighting circuitry 2 and four input connections 88, 90, 92, and 94 of the trailer lighting circuitry 6 are incompatible without adapter circuitry 4. Adapter circuitry 4 interfaces the different number of signals so the two lighting systems can operate together.

Adapter circuitry 4 includes six input connections, 38, 40, 42, 44, 46, and 47, five transistor circuits, three relay circuits, and four output connections 48, 50, 52, and 54 to trailer circuit 6. The adapter connections 38, 40, 42, 44, 46, and 47 deliver signals to the adapter circuitry indicating which vehicle lamps are activated, provide adapter circuitry 4 with a 12.5 v DC power source and provide a universal ground. Each of the five transistor circuits includes a base resistor 55, 56, 57, 58 or 59, and a transistor 61, 62, 63, 64 or 65. The transistor circuits are connected to the input connections, the relay circuits, and ground. These circuits act as a switch, which ground the relay circuits according to the signal received from the input connections. The three relay circuits include relays 67, 68, 69, relay contacts 75, 76, 77, and resistors 71, 72, 73, and 74. These relay circuits are connected to the transistor circuits, power supply 45, and three connections 48, 50, 52. A grounded relay circuit allows current flow through the relay, and consequently, energizes the internal coil. Each relay is operably connected to a relay contact, which opens and closes according to the energization of the relay coil. A closed relay contact connects the appropriate output connection with power. This is the basic structure of the adapter circuitry, and will be explained in more detail in the following paragraphs.

Adapter connections 38, 40, 42 and 44 carry signals indicative of the vehicle lamp operations. Adapter connection 38 carries a signal representative of the vehicle tail lamps 20, 21, and is connected to base resistor 59. Adapter connection 40 represents the state of the vehicle right turn lamp 24, and is connected to base resistor 55. Adapter connection 42 denotes the vehicle brake lamps 22, 23, and is connected to base resistors 56 and 57. Adapter connection 44 represents the vehicle left turn lamp 25, and is connected to base resistor 58. Adapter connections 38, 40, 42, 44 are separated from ground by resistors 100, 102, 104, and 106. The base resistors 55, 56, 57, 58 and 59 are each in series with transistors 61, 62, 63, 64 and 65, respectively, and are connected through a first base transistor terminal 81.

Each transistor 61, 62, 63, 64, and 65 includes the conventional three terminals: a first terminal 81, commonly called a base, a second terminal 82 called an emitter, and a third terminal 83 called a collector. Each base terminal 81 allows very little current flow; therefore there is not a significant voltage drop across the respective base resistor. Since there is very little voltage drop across each base resistor, the signal at the base terminal is essentially the same signal as at the vehicle lamps, such a signal being sufficient to actuate the transistor. In this respect, the vehicle clearance lamps 20, 21 are associated with transistor 65, the vehicle right turn lamp 24 with transistor 61, the vehicle brake lamps 22, 23 with transistors 62 and 63, and the vehicle left turn lamp 25 with transistor 64. Each transistor collector terminal 83 is connected to a relay circuit and each emitter terminal 82 to ground. When a transistor's base terminal is actuated by a signal, the transistor acts as a switch and turns "on". This switch creates a conductive path across the collector and emitter terminals 83, 82, and consequently, grounds the collector terminal.

Each relay circuit is connected to power supply 45, output connections 48, 50, 52, and transistors 61, 62, 63, 64 and/or 65. The two types of relay circuits are one-direction and two-direction. There are two two-direction relay circuits, each includes a relay 67 or 68, two resistors 71, 72 or 73,74, and a relay connection 75 or 76. There is one one-direction relay circuit, which includes relay 69 and relay contact 77. Relay 69 draws current directly from power supply 45 when transistor 65 is actuated. A current flow through a relay will energize its internal coil, which operates the switching state of the associated relay contact. When a single transistor is turned "on", it grounds the collector terminal of the transistor, and hence, a single terminal of the relay circuits. Relay 69 is connected to only one transistor 65; therefore, transistor 65 must be actuated for the coil in relay 69 to be energized. Relay 69 is independently coupled to the clearance lamp signal.

In the case of relays 67 and 68, the grounded collector terminal 83 draws current from power supply 45 across a selected one of the resistors 71, 72 or 73, 74 and through relays 67 or 68 to the ground. Therefore, relay 67 can be activated by either one of the pair of transistors 61, 62 and similarly relay 68 can be activated by either one of the pair of transistors 63, 64, so long as a single relay terminal is grounded. However, if both transistors of a pair are actuated and ground both relay terminals, the relay will not be activated since there is no voltage drop across this device. Since a relay can be activated by either transistor but not both, it operates like an exclusive OR gate (XOR). The relay terminals act as two inputs while the energization state of the relay coil acts as the output. Relay 67 is coupled to the right hand turn signal-and the brake signal; relay 68 is coupled to the left-hand turn signal and the brake signal.

The state of the relay's coil controls the state of the associated relay contacts. Relay contacts 75, 76, 77 act as switches between power supply 45 and the power output connections 50, 52, and 48, respectively. If a relay coil is not energized, the associated relay contact is open, therefore prohibiting power supply 45 from being coupled to that particular output connection. Relay contacts 75, 76 and 77 are operably connected with relays 67, 68 and 69, respectively. If the relay coil becomes energized, the associated relay contact closes and power supply 45 is coupled to the associated output connection.

Adapter circuitry 4 effectively adapts the six signal inputs from the vehicle to the four-input connections 88, 90, 92, and 94 to the trailer. The trailer circuit 6 is connected to the power outputs 48, 50, 52 and ground 54 and energizes the appropriate trailer lamps. It is important to note that, the signal, which originally powered the towing vehicle lamps, is only used as a trigger to connect the power source with the trailer lamps. Consequently, the original power signal is not "passed" through the adapter circuitry. Rather, the vehicle and trailer lamps remain isolated from each other's power source.

The operation of the present invention is described below in a serial fashion, following a single signal through the circuit one lamp at a time. Vehicle clearance input 26 is connected to vehicle clearance lamps 20, 21, and is representative of the vehicle's taillights. The presence of a signal at vehicle clearance input 26 will create a voltage drop across vehicle lamps 20, 21. This voltage drop will cause current to flow through the lamps, therefore, illuminating both lamps 20, 21 simultaneously. Vehicle clearance input 26 is also connected to adapter connection 38, which is coupled to the base terminal of transistor 65 via base resistor 59. The serial connection of the base resistor 59 and the base terminal of transistor 65 allow very little current flow. Because of this negligible current flow, there is virtually no voltage drop across base resistor 59, and the signal at the base terminal of transistor 65 is essentially the same as the signal at adapter connection 38. The voltage at the base of transistor 65 is sufficient to overcome the transistor threshold voltage, and therefore turns "on" the transistor. When transistor 65 is turned "on", there is a conductive path established between the collector and emitter terminals. Since the emitter terminal 82 is connected to ground, the collector terminal also becomes grounded. Relay 69 is connected to the collector terminal as well as power supply 45. Grounding the collector terminal 83 of transistor 65 also grounds one of the terminals of relay 69. A voltage drop is created across relay 69 and causes a current flow across the device. Relay 69 has an internal coil that is operably connected to relay contact 77. Current flow across relay 69 energizes the internal coil, and closes relay contact 77. Relay contact 77, when closed, connects power supply 45 with power input connection 48. This relay contact 77 is normally biased to an open state, which prevents a connection between the power supply and the trailer. However, when relay contact 77 closes as a result of the energization of the internal coil in relay 69, power is supplied to the trailer via power input connection 48. Power input connection 48 is connected to trailer clearance lamps, 34, and 35, which in turn are grounded. A signal at one terminal of the trailer clearance lamps will create a voltage drop across those lamps, induce a current flow, and illuminates the lamps 34, 35. Therefore, a signal that originated at vehicle clearance input 26 and illuminates towing vehicle taillights 20, 21 will also close a circuit to cause illumination of trailer clearance lamps 34 and 35.

If no signal is present at vehicle clearance input 26, then vehicle lamps 20, 21 will not be illuminated and neither will transistor 65 be turned "on". If transistor 65 does not turn "on", then relay 69 has no path to ground, consequently, there will be no current flow. Without current flow, the internal coil of relay 69 will not be energized and relay contact 77 will remain open. If relay contact 77 is open, then trailer lamps 34, 35 will be separated from power supply 45 and will not illuminate. Therefore, if there is no signal on vehicle clearance input 26, neither the vehicle or trailer clearance lamps will be illuminated. As such, towing vehicular tail lights 20, 21 and trailer tail lamps 34, 35 are in phase with each other. They are illuminated together.

Vehicle brake input 28 is connected to vehicle brake lamps 22, 23 and is indicative of the state of the vehicle's brakes. The presence of a signal at vehicle brake input 28 will create a voltage drop across vehicle lamps 22, 23. This voltage drop will cause current to flow through the lamps, therefore, illuminating the lamps simultaneously. Vehicle brake input 28 is also connected to adapter connection 42, which is coupled to the base terminals of transistors 62, 63 via base resistors 56, 57, respectively. These serial connections allow very little current flow; consequently, there is virtually no voltage drop across base resistors 56, 57. Due to the negligible voltage drop across the base resistors, the signals at the base terminals of transistors 62, 63 are essentially the same as the signal at adapter connection 42. These base terminal signals are sufficient to overcome the threshold voltages of transistors 62, 63, and therefore turn "on" the transistors. When transistors 62, 63 are turned "on", there is a conductive path established between each transistor's collector and emitter terminals. Since the emitter terminals are connected to ground, the collector terminals also become grounded. Relays 67, 68 are connected across transistors 61, 62 and 63, 64, respectively.

In addition to the transistor connections, relay 67 is also coupled to power supply 45 via resistors 71, 72. Grounding the collector terminal of transistor 62 connects one of the terminals of relay 67 to ground. If transistor 61 is not turned "on", then a voltage drop occurs across resistor 72 and more importantly, resistor 71 and relay 67. The grounded collector terminal 83 of transistor 62 will cause some current to flow from power supply 45, through resister 71 and across relay 67, thereby energizing the internal coil of relay 67. Energization of the internal coil of relay 67, causes relay contact 75 to close, and connects power supply 45 with power input connection 50. Power input connection 50 is connected to trailer lamp 36. When relay contact 75 is closed, trailer lamp 36 draws current and is consequently illuminated.

Similarly to relay 67, grounding the collector terminal 83 of transistor 63 connects one of the terminals of relay 68 to ground. If transistor 64 is not turned "on", then a voltage drop occurs across resistor 73 and more importantly, resistor 74 and relay 68. The grounded collector terminal 83 of transistor 63 will cause some current to flow from power supply 45, through resister 74 and across relay 68, thereby energizing the internal coil. Energization of the internal coil of relay 68, causes relay contact 76 to close, and connects power supply 45 with power input connection 52. Power input connection 52 is connected to trailer lamp 37. When relay contact 76 is closed, trailer lamp 37 draws current, and is therefore illuminated.

If no signal is present at vehicle clearance input 28, then vehicle lamps 22,23 will not be illuminated and neither will transistors 62,63 be tuned "on". If transistors 62,63 are not turned "on", and neither are transistors 61 or 64, then relays 67,68 will not be grounded. Without ground, there will be no current flow through either relay, and the internal coils of relays 67,68 will not be energized. If the coils of relays 67,68 are not energized, the relay contacts 75,76 will remain open and prevent trailer lamps 36 and 37 from illuminating. Therefore, if no signal is present on vehicle brake input 28, neither the vehicle nor trailer brake lamps will be illuminated. In this mode, when the towing vehicle stop lights 23 and 25 are illuminated, the trailer stop lights 36, 37 are simultaneously illuminated.

Vehicle right turn input 30 is connected to vehicle right turn lamp 24, and is representative of the vehicle's right turn signal. This turn signal is an oscillating signal that pulses between "high" and "low" states, with a predetermined duty cycle. During the period that the signal is "high", the present invention operates as if the signal is on, as described previously for the vehicle clearance and brake signals. During the period that the turn signal is "low", the present invention operates as if the signal were off. The remainder of this paragraph describes that period of the turn signal cycle when the signal is "high" or on. A "high" signal at vehicle right turn input 30 would create a voltage drop across turn signal vehicle lamp 24. This voltage drop will cause current to flow through the lamp, causing illumination. Vehicle right turn input 30 is also connected to adapter connection 40, which is coupled to the base terminal of transistor 61 via base resistor 55. The serial connection of the base resistor 55 and the base terminal of transistor 61 allow very little current flow. Because of this negligible current flow, there is virtually no voltage drop across base resistor 55, and the signal at the base terminal of transistor 61 is essentially the same as the signal at adapter connection 40. The voltage of this signal is sufficient to overcome the threshold voltage of transistor 61, and therefore turn "on" the transistor. When transistor 61 is turned "on", there is a conductive path established between the collector and emitter terminals 83, 82. Since the emitter terminal 82 is connected to ground, the collector terminal 83 also becomes grounded. Relay 67 is coupled to power supply 45 via resistors 71 and 72. Grounding the collector terminal of transistor 61 connects one of the terminals of relay 67 to ground. If transistor 62 is not turned "on", then a voltage drop occurs across resistor 71 and more importantly, resistor 72 and relay 67. The grounded collection terminal 83 of transistor 61 will cause some current to flow from power supply 45 through resistor 71 and across relay 67, thereby energizing the internal coil of relay 61. It should be noted that the current flow is the opposite direction through relay 67 than when transistor 62 was on as previously described. Energization of the internal coil of relay 67, causes relay contact 75 to close, and connects power supply 45 with power input connection 50. Power input connection 50 is connected to trailer lamp 36. When relay contact 75 is enclosed, trailer lamp 36 draws current and is illuminated. Therefore, if no other vehicle signal is "high", the "high" portion of the vehicle right turn signal will illuminate the vehicle right turn lamp 30 and trailer lamp 36 simultaneously.

If no signal is present at vehicle clearance input 30, or during the "low" cycle of the vehicle right turn signal, then vehicle lamp 24 will not be illuminated and neither will transistor 61 be turned "on". If transistor 61 does not turn "on", then relay 67 has no path to ground, consequently, there will be no current flow. Without current flow, the internal coil of relay 67 will not be energized and relay contact 75 will remain open. If relay contact 75 is open, then trailer lamp 36 will be separated from power supply 45 and will not illuminate. Therefore, if no signal is present at vehicle clearance input 30, or during the "low" cycle of the vehicle right turn signal, neither the vehicle nor trailer clearance lamps 24,36 will illuminate. Thus lamps 24 and 36 will pulse in phase with each other in this mode.

Vehicle left turn input 32 is connected to vehicle left turn lamp 25, and is representative of the vehicle's left turn signal. This turn signal is an oscillating signal that pulses between "high" and "low" states, with a predetermined duty cycle. The actuation of the lamp 37 works in the same fashion as previously described for lamp 36. A "high" signal at vehicle left turn input 32 would create a voltage drop across vehicle lamp 25. This voltage drop will cause current to flow through the lamp, causing illumination. Vehicle left turn input 32 is also connected to adapter connection 44, which is coupled to the base terminal of transistor 64 via base resistor 58. The serial connection of the base resistor 58 and the base temiinal of transistor 64 allow very little current flow. Because of this negligible current flow, there is virtually no voltage drop across base resistor 58, and the signal at the base terminal of transistor 64 is essentially the same as the signal at adapter connection 44. The voltage of this signal is sufficient to overcome the threshold voltage of transistor 64, and therefore turn the transistor "on". When transistor 64 is turned "on", there is a conductive path established between the collector and emitter terminals. Since the emitter terminal 82 is connected to ground, the collector terminal 83 of transistor 64 also becomes grounded. Relay 68 is coupled to power supply 45 via resistors 73 and 74. Grounding the collector terminal of transistor 64 connects one of the terminals of relay 68 to ground. If transistor 63 is not turned "on", then a voltage drop occurs across resistor 74 and more importantly, resistor 73 and relay 68. The grounded collector terminal 83 of transistor 64 will cause some current to flow from power supply 45, through resistor 73 and across relay 68, thereby energizing the internal coil of relay 68. It should be noted that the current flow through relay 68 is in the opposite direction than when transistor 63 was on as previously described. Energization of the internal coil of relay 68, causes relay contact 76 to close, and connects power supply 45 with power input connection 52. Power input connection 52 is connected to trailer lamp 37. By closing relay contact 76, trailer lamp 37 draws current and is illuminated. Therefore, if no other vehicle signal is "high", the "high" portion of the vehicle left turn signal will illuminate the vehicle left turn lamp 25 and trailer lamp 37 simultaneously.

If no signal is present at vehicle clearance input 32, or during the "low" cycle of the vehicle left turn signal, then vehicle lamp 25 will not be illuminated and neither will transistor 64 be turned "on". If transistor 64 does not turn "on", then relay 68 has no path to ground, consequently, there will be no current flow. Without current flow, the internal coil of relay 68 will not be energized and relay contact 76 will remain open. If relay contact 76 is open, then trailer lamp 37 will be separated from power supply 45 and will not illuminate. Therefore, if no signal is present at vehicle left turn input 32, or during the "low" cycle of the vehicle left turn signal, neither the vehicle nor trailer lamps 25,37 will be illuminated. Thus, lamps 25 and 37 will pulse in phase with each other in this mode.

The vehicle and trailer clearance lamps work independently of the other vehicle and trailer lamps, and therefore operate as described regardless of the states of the other signals. The following paragraph describes the state when both the brake lamps and the right turn signal are engaged. As previously described, vehicle turn signal input 30 produces an oscillating signal which pulses between "high" and "low" states. When the right turn signal is "low", the system acts as if the turn signal was off and only the brakes were engaged. However, when the turn signal goes high, the adapter circuitry behaves differently. "High" signals on vehicle inputs 28 and 30 illuminate vehicle lamps 22, 24 and pass the high signals to adapter connections 42 and 40. These signals turn "on" transistors 61, 62 and 63. If transistors 61 and 62 are both grounded, then both terminals of relay 67 are also grounded. Therefore, there is no voltage drop or current flow across relay 67. Without current flow through the relay's coil, relay contact 75 will remain open and the trailer lamps will not illuminate. As soon as the oscillating signal from the vehicle goes "low", 61 will turn "off" and a voltage drop and current flow will again be established across relay 67. This current flow energizes the internal coil in relay 67 that activates relay contact 75 and illuminates trailer lamp 36. Therefore, when transistors 61 and 62 are "on", vehicle lamps 22 and 24 are illuminated, but trailer lamp 36 is not. Consequently, vehicle lamp 24 and trailer lamp 36 flash 180° out of phase with each other when both the vehicle brake and right turn signals are activated.

The same conditions will occur, respectively, if the left turn signal and brakes are simultaneously activated. In this case, vehicle left turn lamp 25 and trailer lamp 37 will flash 180° out of phase.

This invention has many advantages over the prior art. Firstly, much of the prior art did not power the trailer lamps with an independent power source, but rather passed along the original signal which powered the vehicle lamps. By using an independent power source, dedicated to powering the trailer lamps, the current invention is able to deliver a much higher output current than similar solid state systems. Secondly, since the trailer lamps receive power directly from a power source, they are isolated from the vehicle lamps. Much of the prior art includes designs which both sets of lamps are tied together. Therefore, the present invention creates an isolated lamp design that decreases the system's susceptibility to short circuits. Additionally, the present invention is able to interface a vehicle lighting system with three lamps per side with a trailer only having two lamps per side, as previously described.

It will thus be apparent that there has been provided in accordance with the present invention a trailer lighting adapter device that achieves the aims and advantages specified herein. It will, of course, be understood that the foregoing description is of preferred exemplary embodiments of the invention and that the invention is not limited to the specific embodiment shown. Various changes and modifications will become apparent to those skilled in the art. All such changes and modifications are intended to be within the scope of the present invention.

We claim:

1. An electrical circuit adapter for use between a towing vehicle lighting system and a trailer lighting system, said electrical circuit adapter comprising:

a plurality of vehicle signal inputs which each receive an electrical signal from the towing vehicle lighting system, each electrical signal being representative of the state of a particular towing vehicle lamp;

a power supply input connected to a power source for receiving a power input signal;

a plurality of three terminal transistors, each of said three terminal transistors having a first transistor terminal coupled to one of said vehicle signal inputs, a second transistor terminal electrically grounded and a third transistor terminal coupled to said power supply input;

a plurality of two directional relays, each of said relays having a first relay terminal connected to said third transistor terminal of respective three terminal transistors and coupled to said power supply input and a second relay terminal connected to said third transistor terminal of another of said three terminal transistors and coupled to said power supply input;

a plurality of relay contacts, each of said relay contacts being operably connected to one of said relays which control the state of said relay contacts; and a plurality of trailer signal outputs connected to said relay contacts and the trailer lighting system, wherein each of said relay contacts selectively couples said power supply input to one of said trailer signal outputs to provide the trailer lighting system with power free from significant power dissipation and amplification.

2. An electrical circuit adapter as defined in claim 1, wherein the power output signal sent by each of said trailer signal outputs is different from the power signal used to drive the lamps of the towing vehicle lighting system.

3. An electrical circuit adapter as defined in claim 1, wherein said plurality of vehicle signal inputs receive electrical signals which are representative of the state of the towing vehicle lighting system right turn lamp, left turn lamp, brake lamp, and tail lamp.

4. An electrical circuit adapter as defined in claim 1, wherein each of said vehicle signal inputs receives an electrical signal from a towing vehicle lighting system having an independent brake lamp and turn signal lamp, and;

each of said trailer signal outputs connected to a trailer lighting system having a combined brake and turn signal lamp for sending a power output signal.

5. An electrical circuit adapter as defined in claim 4, wherein said electrical circuit adapter may selectively disable the power output signal to the combined brake and turn signal lamp of the trailer lighting system when two of said vehicle signal inputs each receives an electrical. signal from the towing vehicle lighting system which would cause one of said relay contacts to couple said power supply input to one of said trailer signal outputs connected to a single combined brake and turn signal lamp.

6. An electrical circuit adapter as defined in claim 1, wherein when said first transistor terminal receives an electrical signal from said vehicle signal input, one of said three terminal transistors couples one of said relay terminals to ground.

7. An electrical circuit adapter as defined in claim 6, wherein said relay contact is open when both of said relay terminals of said operably connected relay are coupled to ground.

\* \* \* \* \*